INVENTORS
CORNELIUS W. SMITH
HENRY H. KERR
RALPH L. SEGER, Jr.
EDWARD K. TOROSSIAN
BY Irwin M. Lewis
ATTORNEY

United States Patent Office 2,854,052
Patented Sept. 30, 1958

2,854,052

TIRE AND RIM ASSEMBLY

Cornelius W. Smith, Grosse Pointe, and Henry H. Kerr, Ralph L. Seger, Jr., and Edward K. Torossian, Detroit, Mich., assignors to United States Rubber Company, New York, N. Y., a corporation of New Jersey Application March 10, 1954, Serial No. 415,372

4 Claims. (Cl. 152—378)

This invention relates to a tire and rim assembly.

The primary object of the invention is to provide a tire and rim assembly, incorporating a resilient tire and a rigid rim, which may be subjected to extreme overloads as regard the tire without damaging or affecting the normal operation of the tire at normal loads or moderate overloads.

To accomplish this object, the rim of the invention is provided with rigid flanges which extend outwardly from the rim face at each side of the tire. The spacing of the flanges, the depth of the flanges, and the transverse width of the tire are so proportioned that when the tire is deflected under load to an extent slightly less than that at which rupture or breakdown of the tire would occur, the tire at the line of maximum deflection will be completely confined between the flanges and any additional load in excess of that necessary to deflect the tire to this extent will be carried directly on the outer peripheries of the flanges and further deflection of the tire will be prevented. By this construction, deflection of the tire to such an extent to cause rupture or failure of the tire is prevented while allowing the tire to function normally under normal loads or moderate overloads.

Preferably, the lateral spacings between the flanges and the sides of the tire increase towards the outer peripheries of the flanges so that the extent of lateral support of the tire and the assumption of the load by the flanges gradually increases as the load on the tire and lateral deflection thereof increases.

The invention, its object, and its advantages having been broadly described above, a more detailed description is given hereafter by reference to the accompanying drawings, wherein.

Figure 1:
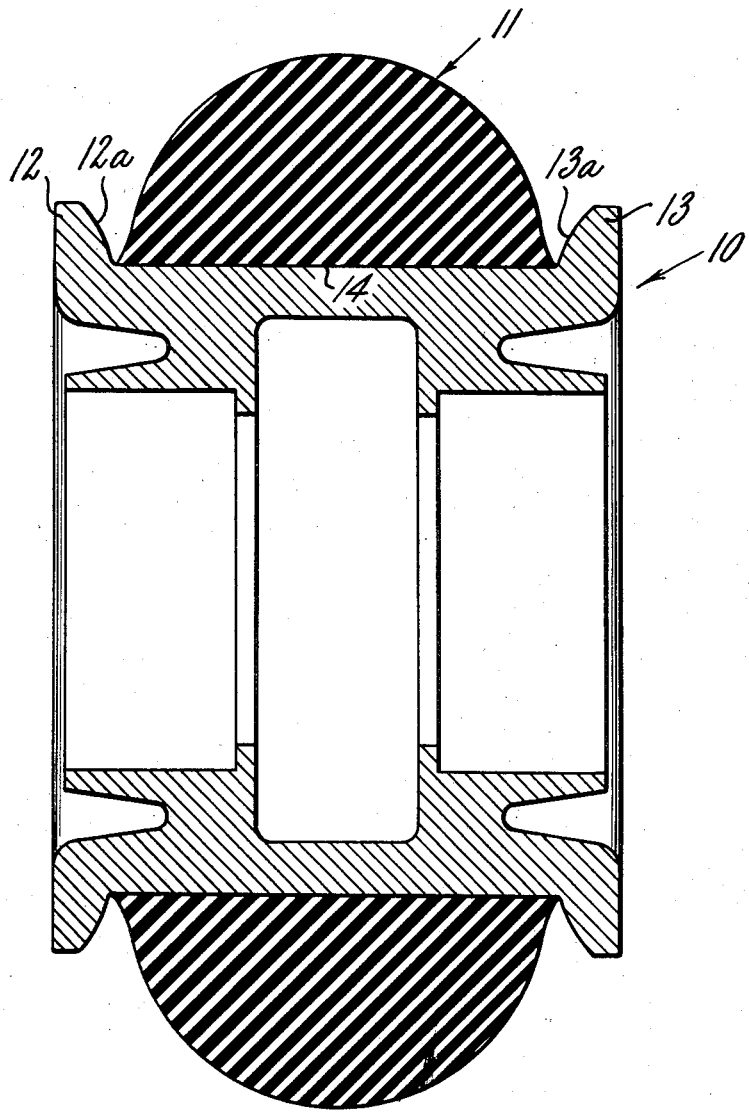
Fig. 1 is a sectional view of one embodiment of the tire and rim assembly of the present invention.

Referring to the drawings, and in particular to Fig. 1 of the drawings, the rim of the invention is generally designated by the reference numeral 10 and the resilient tire by the reference 11. The rim is provided with outwardly extending flanges 12 and 13 and the tire 10 is seated on the rim face 14 between the flanges 12 and 13.

The tire 11 shown is of the solid type formed of resilient rubber and bonded during vulcanization thereof to the rim face 14. The tire 11, however, may be of a solid demountable type in which case a suitable means for mounting the tire must be provided.

Figure 2:
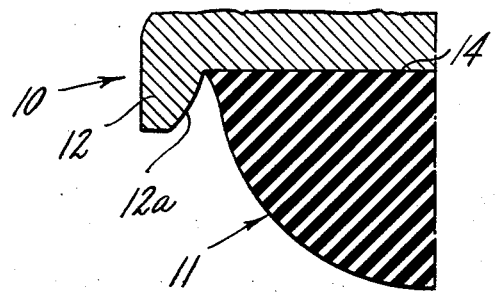
Fig. 2 is a partial sectional view of the tire and rim assembly of the invention under no load conditions.
Figure 3:
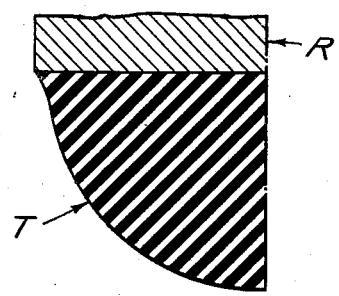
Fig. 3 is a partial sectional view, shown by way of comparison, of a tire of the same shape as that of the invention but mounted on a conventional flat rim, also under no load conditions.
Figure 4:
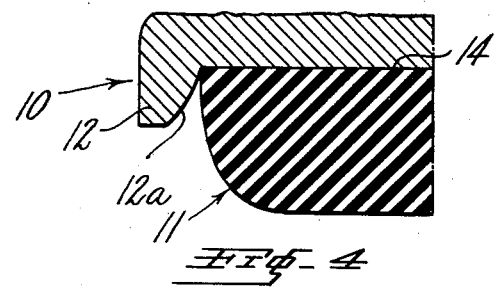
Fig. 4 is a partial sectional view of the tire and rim assembly of the present invention showing deflection of the tire under normal load conditions.
Figure 5:
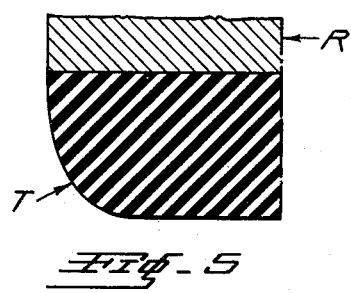
Fig. 5 is a sectional view of the conventional tire and rim assembly of Fig. 3 showing deflection of the tire under normal load conditions.

The present invention lies in the relative proportions of the tire and rim flanges, which prevents rupture or failure of the tire at extreme overloads while allowing the tire to function normally at normal loads or moderate overloads. In accordance with the invention, the height of the rim flanges 12 and 13 as measured from the outer peripheries thereof to the rim face 14 is substantially less than the radial thickness of the tire 11 when undeflected so that up to normal recommended loads, the tire will function in the same manner as a tire of the same shape mounted on a conventional flat rim having no flanges. The similarity of function over normal loads is illustrated by Figs. 4 and 5 which show by way of comparison the deflection of the tire 11 of the tire rim assembly of the invention and the deflection of a tire T mounted on a conventional flat rim R when subjected to normal loads. The tire 11 of the invention is shown under no load conditions in Fig. 2 and the tire T mounted on the conventional flat rim R, is shown under no load conditions in Fig. 3.

The flanges 12 and 13 are, however, of a minimum height essentially or substantially equal to the radial thickness the tire 11 would have at the time of maximum deflection, i. e. if the tire were deflected to such an extent that rupture or failure of the tire would occur. Thus the flanges 12 and 13 prevent the tire 11 from being deflected to such an extent that rupture or failure thereof would occur.

Figure 8:
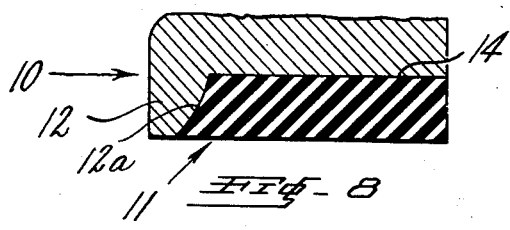
Fig. 8 is a partial sectional view of the tire and rim assembly of the present invention showing deflection of the tire under extreme overload conditions.

The spacing between the flanges 12 and 13 is such that when the tire is deflected under load to the extent permitted by the flanges 12 and 13, the tire at the line of maximum deflection will be substantially confined between the flanges 12 and 13, as shown in Fig. 8, and any additional load over that necessary to deflect the tire to this extent will be carried directly by the flanges. To this end, the flanges 12 and 13 must be of sufficient strength to carry the maximum expected load less that being carried by the deflected tire. It will be noted that the cross-sectional area bounded by the opposed inner surfaces 12a and 13a of the flanges, the rim face 14 and a line extending from the outer periphery of flange 12 to the outer periphery of flange 13 need not be as great as the cross-sectional area of the tire to provide such confinement of the tire between the flanges at the line of maximum deflection, as some of the material of the tire will be displaced circumferentially of the tire as well as laterally when the tire is deflected under load.

It will be appreciated that the minimum height of the flanges 12 and 13 and the spacing thereof may be varied in accordance with the characteristics of the particular tire mounted on the rim 10. That is, certain tires may be able to withstand greater loads and deflection without failure than other tires, and the minimum height of the flanges and the spacing thereof must be proportioned accordingly. The height of the flanges and the spacing of the flanges for any given tire can be readily determined by test and once determined can be used for rims for other tires of the same shape and material.

Figure 6:
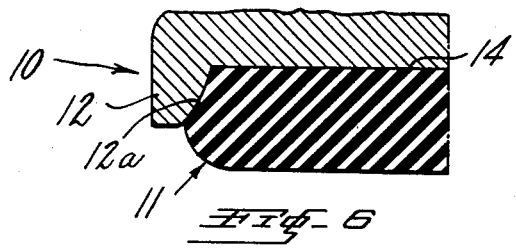
Fig. 6 is a partial sectional view of the tire and rim assembly of the invention showing deflection of the tire under moderate overload conditions.

Preferably, the opposed inner surfaces 12a and 13a of the flanges 12 and 13 are tapered towards the outer peripheries thereof and the sides of the tire tapered towards the outer periphery thereof, so that the space between the sides 12a and 13a of the flanges 12 and 13 and the sides of the tire when undeflected gradually increases towards the outer periphery of the flanges. This provides gradually increasing lateral support to the tire as the tire is deflected under load and also provides for gradual assumption of the load laterally by the flanges 12 and 13, as shown in Figs. 6 and 8. It will be appreciated that this feature of the gradually increasing spacing between the flanges 12 and 13 and the sides of the tire 10 can be provided by tapering only the flanges or only the sides of the tire. In no event, however, should the maximum width of the tire when deflected to the extent permitted by the flanges be materially greater than the maximum width between the flanges at the outer peripheries thereof.

Figure 7:
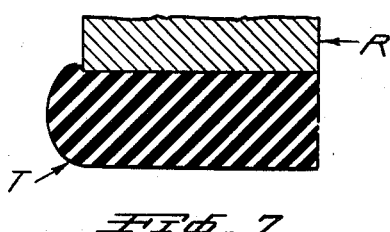
Fig. 7 is a partial sectional view of the conventional tire and rim assembly of Fig. 3 showing deflection of the tire under moderate overload conditions.
Figure 9:
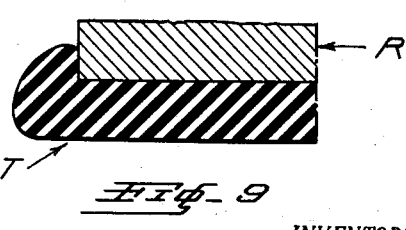
Fig. 9 is a partial sectional view of the conventional tire and rim assembly of Fig. 3 showing deflection of the tire under extreme overload conditions.

The flanges 12 and 13 in addition, prevent lateral displacement or movement of the rubber of the tire in the region of the bonding surface at the edges thereof between the face 14 of the rim and the base of the tire 10 when the tire is moderately overloaded or extremely overloaded as shown in Figs. 6 and 8, and prevents failure of the bond thereby. This is in contrast to that which occurs when a conventional flat rim R having no flanges, as shown in Fig. 3, is used. When the tire T is subjected to moderate or extreme overloads, there will be a displacement or movement of the rubber in the region of the bonding surface particularly at the edges between the face of the rim R and the base of the tire T, as shown in Figs. 7 and 9, which may cause failure of the bond between the tire T and the face of the rim R so that the tire T becomes loose on the rim and will no longer function normally when the stress is removed.

From the above description, it can be seen that there is provided a tire and rim assembly which may be subjected to severe overloads without destroying or materially damaging the tire. The particular tire and rim assembly shown and described is intended to be used as the tail wheel of an airplane, but it may be used advantageously for any purpose where extreme overloads of short duration are likely to be encountered.

While a specific embodiment of the invention has been shown and described, it is to be understood that this is for the purpose of illustration only and not by way of limitation and the changes and modifications can be made therein without departing from the spirit and the scope of the invention.

Having thus described our invention, what we claim and desire to protect by Letters Patent is:

1. A tire and rim assembly comprising, a rim for supporting the tire having a pair of outwardly extending laterally spaced rigid flanges, a solid tire of resilient rubber connected to said rim between said flanges, said flanges having a height substantially equal to the thickness of the tire at the point of maximum deflection when said tire is substantially completely contained between the flanges, said flanges being spaced apart laterally a distance sufficient to be free from engagement with said tire under normal load, said flanges being so shaped with respect to said tire whereby they provide gradually increasing lateral support to the sides of the tire as it is deflected under extreme overloads thus preventing failure of the connection between the tire and its support.

2. A tire and rim assembly comprising, a rim for supporting the tire having a pair of outwardly extending laterally spaced rigid flanges, a solid tire of resilient rubber bonded by vulcanization to said rim between said flanges, said flanges having a height substantially equal to the thickness of the tire at the point of maximum deflection when said tire is substantially completely contained between the flanges, said flanges being spaced apart laterally a distance sufficient to be free from engagement with said tire under normal load, said flanges being so shaped with respect to said tire whereby they provide gradually increasing lateral support to the sides of the tire as it is deflected under extreme overloads thereby preventing failure of the bond between the tire and its support.

3. A tire and rim assembly comprising, a rim for supporting the tire having a pair of outwardly extending laterally spaced rigid flanges, a solid tire of resilient rubber carried by said rim between said flanges, said flanges having a height substantially equal to the thickness of the tire at the point of maximum deflection when said tire is substantially completely contained between the flanges, said flanges being spaced apart laterally a distance sufficient to be free from engagement with said tire under normal load, said flanges being spaced from the sides of said tire a gradually increasing amount extending from the tire supporting surface towards the outer peripheries of the flanges so that the flanges will provide gradually increasing lateral support to the tire and will gradually assume a portion of the load applied radially to said tire as the load on the tire and the deflection caused thereby increases.

4. A tire and rim assembly comprising, a rim for supporting the tire having a pair of outwardly extending laterally spaced rigid flanges, a solid tire of resilient rubber vulcanized in bonded relationship to said rim between said flanges, said flanges having a height substantially equal to the thickness of the tire at the point of maximum deflection when said tire is substantially completely contained between the flanges, said flanges being spaced apart laterally a distance sufficient to be free from engagement with said tire under normal load, the sides of said flanges adjacent the sides of said tire being tapered toward the outer peripheries thereof and the sides of said tire being tapered towards the outer periphery thereof so that a gradually increasing space extending from the tire supporting surface is provided between said flanges and the sides of said tire, whereby the flanges will provide gradually increasing lateral support to the tire and will gradually assume a portion of the load applied radially to said tire as the load on the tire and the deflection caused thereby increases.

References Cited in the file of this patent

UNITED STATES PATENTS

| | | |
|---|---|---|
| 627,672 | Langmuir | June 27, 1899 |
| 741,193 | Turkington | Oct. 13, 1903 |

FOREIGN PATENTS

| | | |
|---|---|---|
| 569,686 | Great Britain | June 5, 1945 |
| 570,988 | Great Britain | Aug. 1, 1945 |